United States Patent [19]
MacFarland

[11] 3,875,436
[45] Apr. 1, 1975

[54] DOUBLE INSULATED VACUUM CLEANER MOTOR HOUSING

[75] Inventor: Charles H. MacFarland, Rocky River, Ohio

[73] Assignee: The Scott & Fetzer Company, Cleveland, Ohio

[22] Filed: July 16, 1973

[21] Appl. No.: 379,405

[52] U.S. Cl............................ 310/43, 310/50, 310/89
[51] Int. Cl. .............................................. H02k 7/14
[58] Field of Search .......... 310/43, 47, 50, 89, 254, 310/258, 259

[56] References Cited
UNITED STATES PATENTS

| | | | |
|---|---|---|---|
| 3,119,942 | 1/1964 | Luther | 310/47 X |
| 3,344,291 | 9/1967 | Pratt | 310/43 X |
| 3,413,498 | 11/1968 | Bowen et al. | 310/47 |
| 3,432,703 | 3/1969 | Sheps et al. | 310/43 X |

Primary Examiner—A. D. Pellinen
Attorney, Agent, or Firm—McNenny, Farrington, Pearne & Gordon

[57] ABSTRACT

A vacuum cleaner motor housing providing a second insulating barrier between the functional insulation of the vacuum motor and the conducting base of a vacuum shroud used to produce the cleaning suction. The conducting base section forms a part of the motor housing with a protruding cylindrical sleeve into whose inner bore a non-conducting section forming the remaining part of the housing is mounted. The non-conducting section encloses the functional insulation of the vacuum motor, including the brush contacts for the commutator, armature windings, and field windings, in one preformed molded piece, thereby insulating them from the conducting section. The non-conducting molded section also has a plurality of deformable ribs on each of three mounting surfaces to ensure a coaxial relationship of the armature and field cores of the motor and to facilitate manufacture and assembly.

6 Claims, 4 Drawing Figures

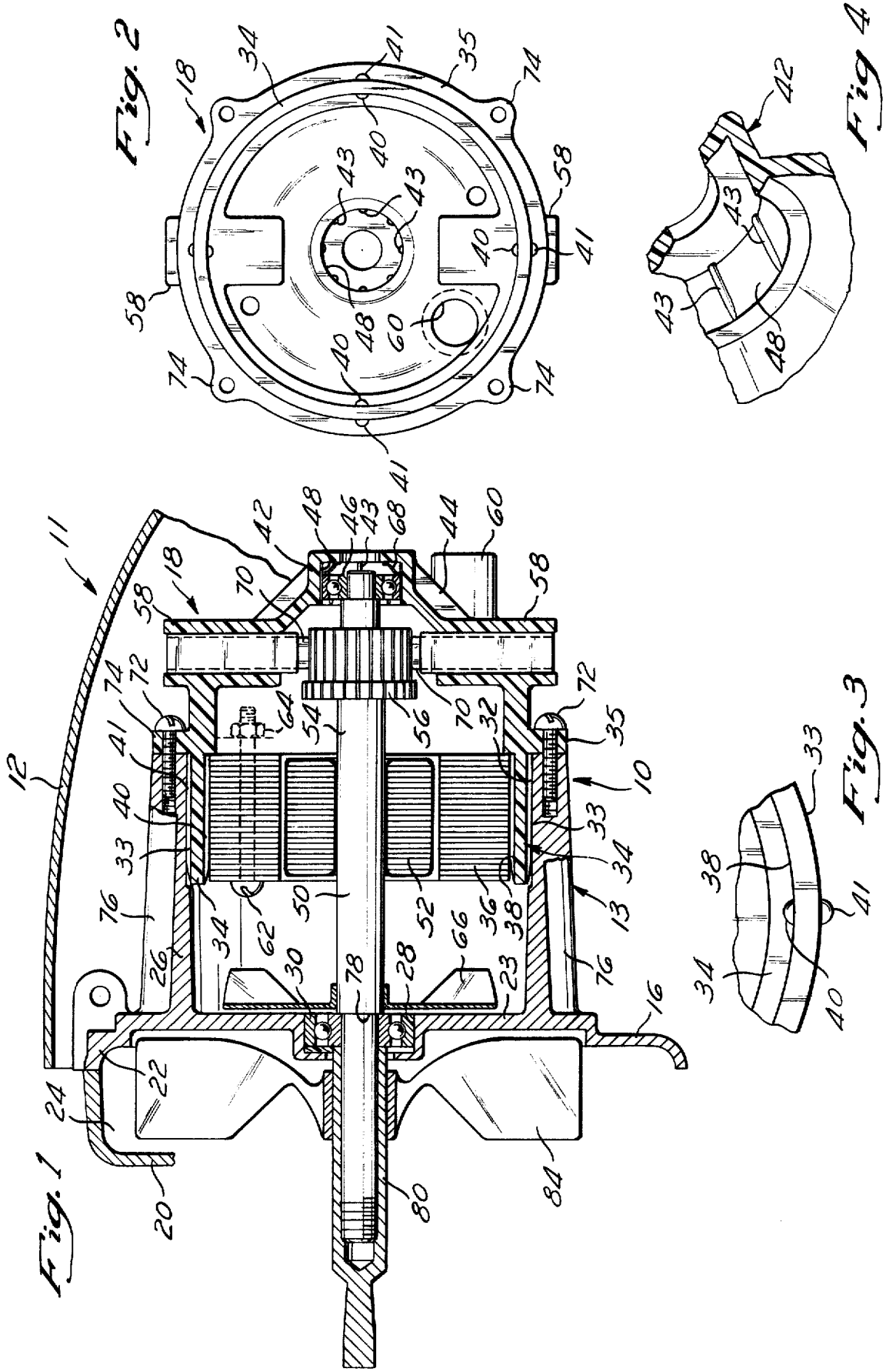

DOUBLE INSULATED VACUUM CLEANER MOTOR HOUSING

BACKGROUND OF THE INVENTION

The invention is generally related to the art of small electric motors, and is more particularly directed to double-insulated motors for vacuum cleaners.

Double insulation is accomplished by placing a secondary layer of insulating material over the functional insulation of an electric device. The safety of the operator necessitates the second protecting barrier to provide insurance against electric shock if the functional insulation of the device becomes inoperative. The functional insulation referred to is generally the primary protective covering of the power windings of the device. Double insulation also generally eliminates the need for the conventional three-wire plug system and the human element involved in using it.

It is often desirable to provide an electric motor with an outer metal shell, which is therefore conductive, even though the shell may be contacted by a person. The hazard of touching a metal case that has become electrified from the failure of the primary or functional insulation on the windings of the motor necessitates the extra insulation, especially when working in damp areas.

While acknowledging the desirability of double insulation of a motor, known techniques are not without certain problems. Manufacture and assembly are complicated by an increase in parts and the physical relationship which the parts must bear to each other. Ordinarily, different insulating parts are needed for the field core, armature core, and armature shaft. Still additional insulating parts are needed to prevent brush contacts and lead-in wires from becoming shorted against a conducting outer shell. All these extra insulating parts need to be manufactured and assembled at an increasing cost to the producer.

Further, it is generally harder to machine or mold insulating sections of a housing to the exacting tolerances needed for assembly than it is to machine conducting metal sections. Molding processes are inherently imperfect and insulating materials are generally too hard (ceramic) or soft (plastic) to machine well.

Fairly close tolerances are needed, as the assembly of insulating parts and outer conducting parts must support the armature of the motor and allow it to turn within the air gap of the field core. If the parts are not fitted together properly, the armature will not turn properly in the field core, thereby reducing the efficiency of the motor. Some in the art have tried to solve the assembly problems by supporting all nonconducting sections by metal parts, such as by insulated field mounting bolts. This solution adds additional parts which must be manufactured and assembled.

Further complicating the problem is the thermal incompatibility of metals and many commonly molded, plastic-like, insulating materials. Plastics have a much higher coefficient of expansion than do metals, so that heat generated during motor operation may cause warping of the structure as the two dissimilar materials expand and contract at different rates. This warping of the supporting structure of a motor can add to or create vibration sources and severely limit its power output.

The potential of an accident caused by the failure of functional insulation of a vacuum motor is as great as with hand tools, while the precautions taken against it are likely to be less. Generally, persons using such cleaners are not as aware of the hazard of an electrified casing as are users of hand tools. Also, in the living area of a home where a majority of these cleaners are used, the three-wire protecting ground socket is not commonly provided. Therefore, double insulation provides a safe and economic alternative to protect a vacuum cleaner user from the hazard of an electrified motor housing.

SUMMARY OF THE INVENTION

The invention provides a doubly insulated motor housing formed from a supporting conducting section and a non-conducting section received within it. The non-conducting section is a unitary, molded piece needing no extra machining for assembly. One each mounting surface of the molded section, a plurality of ribs are provided to reduce problems associated with dimensional tolerances. The ribs allow limited deformation of the mounting surfaces, whether in molding, assembly, or expansion, without significantly affecting the function or performance of the motor.

Accordingly, one object of the invention is to reduce the number of parts needed to be manufactured and assembled, thus simplifying the production process. The invention does this by combining many of the previously needed parts into one integrally molded, non-conducting section.

Since the non-conducting housing section is substantially rigid and supplies a supporting function, another object of the invention is to position the armature and field in a rotating relationship without being hampered by the dissimilar expansion rates of the insulating section and conducting section.

A further object of the invention is the elimination of separately insulated field mounting bolts. The rigidity provided by the non-conducting section allows the mounting bolts to be fastened to the insulating material rather than necessitating a conducting connection and associated extra insulators.

Other objects and advantages of the invention will be evident from the following detailed description.

BRIEF DESCRIPTION OF THE DRAWINGS

FIG. 1 is a cross sectional view of a housing and motor in a vacuum cleaner according to the invention;

FIG. 2 is an end view of the non-conducting section of the motor housing shown in FIG. 1;

FIG. 3 is a fragmentary view of the insulating sleeve of the non-conducting section shown in FIG. 2; and FIG. 4 is a fragmentary view of a bearing mounting area of the non-conducting section shown in FIG. 2.

DETAILED DESCRIPTION OF THE DRAWINGS

The invention is shown in FIG. 1 to advantage, where a double insulated electric motor 10 is adapted for use in a conventional, domestic vacuum cleaner, partially shown at 11, and including a shell 12. A motor housing 13 is mounted within the shell 12. The double insulated housing 13 is formed by two sectional pieces, a metal electrically conducting shroud base 16, and an integrally molded insulating housing section 18.

The shroud base 16 is usually made of a light metal, such as aluminum, to provide strength and durability to the housing assembly 13 and to support a fan shroud 20. The shroud 20 is attached to and supported by a generally upraised lip 22 of the base 16, and together the shroud and an end wall 23 of the base form a vacuum chamber 24 of the cleaner 11. The shroud base 16 forms part of the double insulated motor housing 13 by an integral cylindrical extension or sleeve 26 which extends away from the end wall 23. Coaxial with a cylindrical inner bore of the sleeve 26 is a cylindrical bearing recess 28 providing a frictional fit mounting for an armature shaft bearing 30. A cylindrical bore 32 machined within the furthest extension of sleeve 26 receives an outer surface 33 of an insulating ring or sleeve 35 integrally formed on the insulating housing section 18. The insulating ring 34 is limited in its travel into the sleeve 26 by a shoulder 35, also integrally formed on the insulating housing section 18.

A field core 36 of the electric motor 10, conventionally made of disc-shaped conducting laminates, is received into an insulating inner surface or cylindrical bore 38 of the insulating ring 34. The field core 36 is thus aligned with armature shaft bearing 30 and has its functional insulation protected from the conducting shroud base 16.

The insulating ring 34 is molded on both mounting surfaces 33,38 with a plurality of ribs 40,41 that function as spacers between the field core 36 and the insulating ring and between the ring and the cylindrical bore 32 of sleeve 26, respectively. The ribs 40,41 eliminate the need for machining of the insulating housing section 18, and provide for the correct spacing of the field core 36 in the housing 13, without the need for relatively close tolerances. The circumferentially arranged ribs 40,41, which are better illustrated in FIGS. 2 and 3, are radially aligned opposite one another on either side of the insulating ring 34 at substantially equal angular intervals. The ribs 40,41 are longitudinally aligned with the axis of the ring 34. The ribs 40,41 engage the respective members 36 and 26 to facilitate reliable mounting regardless of slight dimensional variations by providing lateral local deformation, either elastic or plastic, in themselves, and by allowing a limited amount of flexing of the walls of the ring 34 intermediate the ribs.

The insulating housing section 18 is an integrally molded section of a durable insulating material, preferably a plastic such as Lexan. The insulating housing section 18 at an end opposite the field core 36 includes an integrally molded bearing casing 42 reinforced by molded ribs 44 and having a cylindrical bearing recess or surface 48 for a second armature shaft bearing 46. The recess 48 has a plurality of ribs 43 similar to those on the mounting surfaces 33,38 of the insulating ring 34. The ribs 43 accommodate dimensional variations of the bearing casing 42 in the same manner as the earlier described ribs 40,41.

An armature shaft 50 is journaled on the bearings 46 and 30. The shaft 50 supports an armature core 52, which is fixed to it, concentrically in the air gap of the field core 36. Double insulating protection is provided the armature shaft 50 by a shaft covering 54, which is a non-conducting sheath used to cover the shaft axially along the armature core 52 to a commutator 56. The commutator 56, in a known manner, supplies power to the windings of the armature core 36.

The insulating housing section 18 further ensures against functional insulation failure by providing insulative brush holders 58 and an insulative power conduit 60. The holders 58 and power conduit 60 are integrally molded into the non-conducting section 18, and consequently do not require separate manufacture or assembly. Total double insulating protection may be obtained by the use of grommets (not shown) upon the entrance of the power cord into the vacuum cleaner shell 12.

The assembly of the cleaner motor 10 in its double insulated housing 13 is facilitated by the above design, and consists of the following steps. The field core 36 is positioned into the insulating bore 38, and may be tightened in the bore by field mounting bolts 62 that thread into hex nuts 64 recessed in the insulating housing section 18. The power windings (not shown) of the field core 36 exit the housing 18 through the power conduit 60. Next, the armature shaft 50, on which shaft covering 54, commutator 56, armature core 52, and a cooling fan 66 have been mounted, is press-fitted with bearing 46. This entire armature assembly may then be inserted through the air gap of the field core 36 until the second armature bearing 48 comes to rest against a push finger spring 68 in the second bearing recess 46. The spring 68 provides for the correct placement of the shaft 50 in the bearings 30,46, with allowance for slight length differences and thermal expansion. The fan 66 circulates air to the opposite end of the housing 13 to cool the field core 36. The fan 66 is advantageously arranged in the conductive housing section 16 to improve heat transfer therewith.

A pair of brushes 70 are then connected and placed in their holders 58. The insulating housing section 18 is subsequently pressed into the bore 32 and fastened in place by mounting bolts 72 through bosses 74 on the shoulder 35 of the insulating housing section and into ribs 76 threaded to receive them. The armature shaft 50 is held in position by shaft shoulder 78 which abuts the inner race of bearing 30 and is locked into place by screwing onto the end of the shaft 50 a locking sleeve 80 on which is mounted a vacuum fan 84.

Although a specific embodiment of the invention has been shown and described in detail, various modifications and rearrangements of parts may be made without departing from the scope of the invention as defined by the following claims.

What is claimed is:

1. A vacuum cleaner comprising a metal housing assembly providing a bearing support wall extending radially inward to a first bearing support portion, a fan shroud adjacent one side of said bearing support wall and an extension having generally cylindrical inner wall portion extending from said bearing support wall on the other side thereof; a unitary non-conducting motor housing having a cylindrical portion telescoping into said cylindrical inner wall portion and being laterally supported thereby, said motor housing providing a central portion adjacent said cylindrical portion having brush holders therein and a second bearing support portion on the side of said central portion remote from said cylindrical portion; a motor field core mounted within said cylindrical portion and enclosed thereby; an armature assembly including the shaft supporting a main fan within said shroud; a first bearing in said first bearing support portion journaling said shaft adjacent said main fan; a second bearing in said second bearing support portion journaling said shaft adjacent the end thereof; an armature on said shaft within said field; a commutator on said shaft within said brush holders; and a sleeve of insulating material electrically insulating said shaft from said armature and commutator; said metal housing assembly supporting said motor housing to a location substantially adjacent to said commutator; said metal housing assembly and said motor housing providing sufficient strength to withstand impact loads occurring when objects are pulled into and engage said main fan.

2. A vacuum cleaner as set forth in claim 1 wherein said motor housing includes circumferentially spaced deformable means adapted to deform at adjacent areas of engagement between said cylindrical portion of said non-conducting motor housing and said cylindrical inner wall portion of said metal housing assembly.

3. A vacuum cleaner as set forth in claim 2 wherein said non-conducting motor housing includes second circumferentially spaced deformable means adapted to deform at adjacent areas of engagement between said cylindrical portion thereof and said motor field core.

4. A vacuum cleaner as set forth in claim 3 wherein said non-conducting motor housing includes third deformable circumferentially spaced means adapted to deform at adjacent areas of engagement between said second bearing support and said second bearing.

5. A vacuum cleaner as set forth in claim 4 wherein said first, second and third deformable means are substantially identical and comprise deformable ribs having a longitudinal axis parallel to the central axis of said non-conducting motor housing.

6. A vacuum cleaner as set forth in claim 5 wherein a second fan is mounted on said shaft within said generally cylindrical inner wall portion of said metal housing and spaced from said unitary non-conducting motor housing.

* * * * *